3,595,966
PROCESS FOR THE PRODUCTION OF SULFUR
Pierre A. Mathieu, Arthez-de-Bearn, France, assignor to Societe Nationale des Petroles d'Aquitaine, Paris, France
No Drawing. Continuation-in-part of applications Ser. No. 761,368, July 11, 1968, and Ser. No. 805,044, Mar. 6, 1969, which are, respectively, continuations of applications Ser. No. 520,204, Jan. 12, 1966, and Ser. No. 541,497, Apr. 11, 1966. This application Oct. 2, 1969, Ser. No. 863,379
Claims priority, application France, Jan. 22, 1965, 3,085; Apr. 13, 1965, 12,941
Int. Cl. C01b 17/04
U.S. Cl. 23—225R
4 Claims

ABSTRACT OF THE DISCLOSURE

Sulfur is prepared by the simultaneous introduction of hydrogen sulfide and sulfur dioxide into an aqueous medium containing from 10 to 120 grams sodium chloride and from 0.6 to 85 grams magnesium sulfate per liter.

---

The process comprises the simultaneous introduction of hydrogen sulphide and sulphur-dioxide into an aqueous medium containing salts of monovalent ions and lesser amounts of salts of polyvalent ions, which produces sulphur of larger grain size and purity than has been possible heretofore. This application is a continuation-in-part of my patent application Ser. No. 761,368 filed July 11, 1968, and Ser. No. 805,044 filed Mar. 6, 1969, which were, respectively, continuations of my patent applications Ser. No. 520,204 filed Jan. 12, 1966, and Ser. No. 541,497 filed Apr. 11, 1966, all now abandoned.

It is well-known that sulfur can be precipitated in an aqueous medium by use of the so-called "Claus reaction" in accordance with the following equation:

$$2H_2S + SO_2 = 3S + H_2O$$

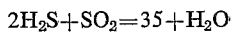

The aqueous medium can consist of water alone or of a solution of salts, such as chlorides, sulphates, etc., of sodium, potassium, magnesium, calcium, etc.

The prior art, recommended the use of concentrated saline solutions, either saturated (U.S. Pat. No. 1,995,545 of July 12, 1933) or very diluted solutions containing, for example, 0.005 to 0.05 equivalent of aluminum sulphate per liter as described in U.S. Pat. No. 2,563,437 of Mar. 24, 1949. The use of acid electrolytes has also been suggested in U.S. Patent No. 2,563,437, supra, and in U.S. Pat. No. 2,534,063). In practice, the desulphuration yields of the gases thus treated at ambient temperature, usually between 20° and 30° C. are good, but it is found that the rate of recovery of the sulphur is reduced if the aqueous medium, after separation from the sulphur produced, is re-used several times in succession. For example, when manufacturing sulphur by the reaction indicated above at a temperature between 20 and 30° C., in saline water, a desulphuration yield which is practically constant at about 85% is found when the liquid is recycled after filtration of the sulphur, each cycle lasting 3 hours. However, the rate of recovery of the sulphur falls from 88% at the start to 35%, after the liquid has been recycled four times. Furthermore, it is found that the speed of sedimentation of the sulphur falls in proportion as the liquid is recycled; the sulphur becomes increasingly more colloidal. These and other difficulties experienced with the prior art methods have been obviated in a novel manner by the present invention.

It is, therefore, an outstanding object of the present invention to produce a process for the production of sulfur in which it is possible to recycle the aqueous medium without reduction of yield.

Another object of this invention is the provision of a method of producing sulfur which can be carried on continuously without loss of efficiency.

A further object of the present invention is the provision of a sulfur-yielding process in which the sulfur obtained shows excellent sedimentation and is deposited immediately upon being formed.

It is another object of the instant invention to provide a process for the production of sulfur in which the rate of recovery of sulfur is maintained at a predetermined value.

With the foregoing and other objects in view which will appear as the description proceeds, the invention resides in the combination and arrangement of steps and in the details of operation hereinafter described and claimed, it being understood that changes in the precise embodiment of the invention herein disclosed may be made within the scope of what is claimed without departing from the spirit of the invention.

SUMMARY OF THE INVENTION

In general the process of the present invention consists in passing hydrogen sulphide and sulphur dioxide (optionally but not essentially in the presence of gaseous hydrocarbon gas) into an aqueous medium containing an electrolyte consisting of monovalent anions and cations and a further electrolyte consisting of polyvalent anions and cations.

More specifically, there are two critical features of the present invention. The sulphur dioxide and the hydrogen sulphide are introduced into the aqueous medium simultaneously in contrast to the practice of the prior art wherein the hydrogen sulphide was first dissolved in the aqueous medium and sulphur dioxide added subsequently thereto. It is a further critical feature of the invention that the total concentration of polyvalent ions be less than the total concentration of monovalent anions.

DESCRIPTION OF THE PREFERRED EMBODIMENT

In accordance with the preferred embodiments of the present invention there is prepared an aqueous solution containing polyvalent, suitably divalent anions and cations and monovalent anions and cations in such a manner that the ratio of total polyvalent ions to total monovalent ions is always less than 0.75:1. Where $C_2$ represents the total concentration of polyvalent ions and $C_1$ represents the total concentration of monovalent ions, the preferred ratio of $C_2:C_1$ is 0.05:1 to 0.75:1 most suitably between 0.1:1 to 0.5:1.

Any salts may be used as ion sources in the aqueous medium provided that the medium produced thereby is substantially neutral. Thus, there may be used as a source of monovalent ion alkali metals such as sodium, potassium or lithium; also suitable are strong nitrogenous bases such as the ammonium anion. In association with these anions may be utilized the monovalent cations of acids, such as the chloride or nitrate ion.

With respect to the polyvalent ions, there may be utilized the ions of the alkaline earth metals such as calcium, or magnesium or trivalent anions such as aluminum or iron; tetravalent ions may also be utilized. Associated with these anions may be the cations of strong acid such as sulphate, sulphite, phosphate, polythionate and the like. Thus, virtually any common combination of monovalent and polyvalent anions and cations may be utilized provided that they yield a substantially neutral aqueous solution.

Especially preferred, however, is the combination of monovalent ions supplied by sodium chloride together with the polyvalent ions supplied by magnesium sulphate. This combination being especially preferred because of its essential cheapness rather than specific technical advantages supplied thereby. In fact, such a combination is present in sea water which contains an approximate concentration per liter of 27 grams of sodium chloride, 1 gram of potassium chloride, 4 grams of magnesium chloride and 1.7 grams of magnesium sulphate. This concentration falls within the limits of the concentration of the present invention and thus provides a readily accessible and inexpensive source of aqueous media for the practice of the present invention.

Certain experiments were carried out to compare the preparation of sulfur by reacting $H_2S$ with $SO_2$ by the method described in U.S. Pat. No. 1,995,545 and by the method of the present invention.

Into a glass reactor of 3 liters, provided with a turbo-agitator rotating at 2300 r.p.m., with an inlet tube for gas reaching the bottom of the reactor, and an outlet tube for the gas, 2 liters of water were introduced, which contained an amount of electrolyte indicated below under A–1 to A–4 and B–1 to B–4.

Two series of experiments were performed at room temperature:

Series A

While the turbo-agitator rotated, a current of 33 liters per hour of 10% $H_2S$ by volume containing butane was passed for 3 hours through said water. Subsequently, still under stirring, a current of 17 liters per hour of 5% by volume $SO_2$ containing butane was passed for 3 hours through the above water which has absorbed $H_2S$. As soon as passing the gas and stirring were stopped, the sedimentation of formed sulfur was observed: the time was noted until no longer sulphur particles were seen falling onto the layer of sulphur deposited on the bottom of the reactor. If that time was "$t$" seconds and the height of the liquid layer above the sulphur deposit was "$l$" millimeters, the velocity of sedimentation "$V$" was calculated as $V = (1:t)$ mm./sec.

The operation was repeated with four different aqueous media, constituted by water having dissolved therein:

A–1—29.2 g. NaCl (0.5 equivalent) per liter;
A–2—29.2 g. NaCl (0.5 equivalent) and 60.2 g. $MgSO_4$ (1 equivalent) per liter;
A–3—29.2 g. NaCl (0.5 equivalent) and 6 g. $MgSO_4$ (0.1 equivalent) per liter;
A–4—1 g. NaCl (0.017 equivalent) per liter.

Series B

While the turbo-agitator rotated a gaseous current of butane containing by volume 10% $H_2S$ and 5% $SO_2$ was passed through the water during 3 hours. Then the sedimentation of sulphur was observed, and its velocity was calculated in the same manner as in the experiments of Series A.

The operation was repeated with the following four different electrolyte concentrations in the water used:

B–1—29.2 g. NaCl (0.5 equivalent) per liter;
B–2—29.2 g. NaCl (0.5 equivalent) and 60.2 g. $MgSO_4$ (1 equivalent) per liter;
B–3—29.2 g. NaCl (0.5 equivalent) and 6 g. $MgSO_4$ (0.1 equivalent) per liter;
B–4—1 g. NaCl (0.017 equivalent) per liter.

The results obtained in each of the above runs are set forth in the following table.

TABLE

| Run | V, mm./sec. | Supernatant liquid |
|---|---|---|
| A–1 | 0.7 | Almost clear. |
| A–2 | 0.75 | Clear. |
| A–3 | 0.6 | Cloudy. |
| A–4 | <0.01 | Very cloudy (colloidal solution). |
| B–1 | 0.8 | Clear. |
| B–2 | 0.8 | Cloudy. |
| B–3 | 1.05 | Clear. |
| B–4 | <0.01 | Very cloudy (colloidal solution). |

Clearing by filtering the supernatant liquid in runs A–3 and B–2 was rather difficult, while it was quite impossible with A–4 and B–4, due to the colloidal nature of these liquids.

In Series A, the best result is obtained in run A–2 which confirms the opinion expressed in U.S. Pat. No. 1,995,545 as to the usefulness of the addition of magnesium sulphate. However, runs A–4 and B–4 show that a very small amount of NaCl (0.017 equivalent) is not sufficient.

On the other hand, these tests show that when the reactants $H_2S$ and $SO_2$ are simultaneously introduced into the aqueous medium (Series B), a surprising result is noted. While in Series A best results are obtained in A–2 (i.e., with an excess of magnesium sulphate over sodium chloride), and poorer results in A–3 (with an excess of NaCl over $MgSO_4$), in Series B (i.e., with simultaneous addition of the reactant gases), in B–3 where there is excess NaCl over $MgSO_4$, the sedimentation rate is the greatest of all the test runs. Thus it is clearly demonstrated that the best results are obtained using simultaneous addition of the reactant gases into a solution containing sodium chloride together with but in excess of magnesium sulphate.

The other operative conditions for the preparation of sulphur from $H_2S$ and $SO_2$ are generally known by the prior art, and they also apply to the method according to the invention. Nevertheless, said method may be carried out in ambient temperature with a very vigorous agitation.

In order that the invention may be more clearly understood, the description is illustrated by the following series of examples given by way of non-limiting embodiments of the invention.

EXAMPLES 1 TO 7

The tests are carried out in a reactor of 3 liters, provided with a Moritz turbo-agitator rotating at 2300 revolutions per minute, an inlet tube for the gaseous mixture to be treated, reaching to the bottom of the reactor, and an outlet tube for the gas. Into the reactor is introduced 2000 ml. of aqueous medium, at the bottom of which is introduced a gaseous current constituted by a mixture of butane, $H_2S$ and $SO_2$, whilst the turbo-agitator rotates at the above-mentioned speed. The liquid is at ambient temperature. The gas is made to pass at the rate of 50 l./h. for 3 hours; at this moment, the latter is separated by decantation in order to be used again, the speed V of this decantation is noted; its magnitude, expressed in mm./sec., is indicated in the fifth column of the following table.

TABLE 1

| Example No. | $H_2S$, percent | $SO_2$, percent | Liquid | V, mm./sec. | |
|---|---|---|---|---|---|
| 1 | 5 | 2.5 | Sea water | 0.9 | Clear supernatant liquid. |
| 2 | 10 | 5 | do | 1.1 | Do. |
| 3 | 20 | 10 | do | 1.0 | Do. |
| 4 | 30 | 15 | do | 0.9 | Do. |
| 5 | 10 | 5 | 35 g./l. NaCl | 0.8 | Do. |
| 6 | 10 | 5 | Distilled water | 0.3 | Cloudy medium. |
| 7 | 10 | 5 | Water plus 0.5% NaCl, 1% $MgSO_4$ | 0.7 | Very cloudy medium. |

In tests Nos. 1 to 4, variable contents of $H_2S$ and $SO_2$ in the butane show that the precipitated sulphur settles substantially at the same speed, whatever may be the concentration in $H_2S$ of the gas treated. The yields vary from 35 to 95%. In test No. 5, the liquid used was an aqueous solution of 35 g. NaCl per liter; the sulphur obtained settled somewhat more slowly. Control test No. 6, carried out with distilled water led to a much slower sedimentation of the sulphur; moreover, the separated liquid was cloudy and contained colloidal sulphur. On the other hand, while the suspensions of S of Examples 1 to 5 filter easily without any clogging of the filter cloth, a rapid clogging took place in the case of tests Nos. 6 and 7.

EXAMPLE 8

The reactor of the preceding examples is set up with a view to continuous working; it is provided with an overflow at its upper part and with a supplementary tube, reacting to the bottom, for the continuous introduction of liquid. Into the reactor there is passed, per hour, 40 liters of mixture of methane and nitrogen, containing by volume 10% of $H_2S$ and 5% $SO_2$, the turbo-agitator turning at 2500 revolutions/min. 2000 ml. of sea water are introduced initially into the apparatus. From the time when the reactor contents are constituted by an aqueous suspension of 285 g. of sulphur per liter, the introduction of sea water is commenced from the decantation of a preceding operation; the suspension running from the overflow is collected and decanted. The liquid thus separated is reintroduced into the reactor with a slight addition of fresh sea water, required to compensate for the small amount of liquid retained in the cake of sulphur, obtained from the decantation sediment, after filtration. On the average, the decantation is done at a speed of 1.2 mm./sec. The average yield of sulphur collected, with respect to $H_2S$, is 93%.

Further research which led to the present invention showed that the aforementioned difficulties previously encountered in the manufacture of sulfur, were due, at least to a major extent, to the formation of polythionic acids; it is in this form that a fraction of the sulfur being used is lost. Another unexpected discovery is the fact that the formation of polythionic compounds is reduced when the temperature of the reaction medium is maintained around 50° C. and in practice in the range from 45° to 65° C. The process carries out the CLAUS reaction in an aqueous medium at a temperature which is in the range from 45° to 65° C., preferably as close as possible to 50° C. At this last-mentioned temperature, it is possible to obtain recovery rates of the sulfur in the order of 90 to 98%, and these rates do not change when the liquid is recycled.

Another feature of the invention lies in controlling the liquid medium in which the precipitation of the sulfur is taking place from the point of view of its acidity, so that the latter does not exceed the value of 0.04 equivalent per liter. It has actually been found that, during the manufacturing operation, where recycling of the liquid is used, the aqueous medium gradually becomes acid and this results in poor total yield and slow sedimentation. According to the invention, the medium is neutralized so as to avoid its pH value falling below 6; the pH is preferably kept at a value which is in the range between 6 and 7.

The neutralization of the liquid medium is preferably brought about after the separation and before the recycling of the liquid; as neutralizing agents, it is possible to employ known bases, but preferably insoluble agents, such as lime or calcium carbonate, which lead to salts which are only slightly soluble.

It is to be understood that the neutralization carried out in accordance with the present invention is effective on all the liquid within which $H_2S$ and $SO_2$ are to react, and not only on a fraction intended to absorb the $H_2S$, such as provided for in certain publications of the prior art, such as U.S. Pat. No. 1,900,398.

The first of the characteristics of the new process, namely, the operation carried out between 45° and 65° C., represents an improvement, both in connection with the process which does not use the recycling of the liquid medium and that in which this liquid is used again. In this latter case, the second feature, namely, the control of the acidity of the medium, is particularly important.

The improved process in accordance with the invention can be applied to any of the known variants of the prior art process carried out in liquid medium; particularly favorable results are obtained when this improvement is employed in the process in which the liquid medium is formed by water containing the certain well-defined porportions of electrolytes set forth above, and, more especially, sodium chloride and magnesium sulphates. It is especially appropriate to use sea water as the liquid medium for the precipitation of sulfur.

One aqueous medium which is very suitable for carrying the invention into effect contains, per liter, 0.2 to 2 equivalents or preferably 0.4 to 1.2 equivalents of a monovalent electrolyte, particularly NaCl, KCl, LiCl or $NH_4Cl$, and 0.01 to 1.4 equivalents of polyvalent electrolyte, for example, $MgSO_4$; the ratio between this second concentration and the first is generally in the range from 0.05 to 0.75 and is preferably in the range from 0.1 to 0.5.

In carrying out the process according to the invention, each of the reagents, $H_2S$ and $SO_2$ can be bubbled into the liquid medium separately, or these gases can be mixed together before coming into contact with the liquid. It is essential to achieve a gas/liquid dispersion which is as fine as possible. This result can be obtained, for example, by the use of turbo-stirrer, of the Moritz type, or an agitator of the Bicone type. The efficiency of the agitator can be increased by providing baffle plates in the reactor. The agitation or stirring speeds are preferably between 1500 and 5000 r.p.m., depending on the type of agitator being used; it is desirable to use the highest possible speeds.

The invention is further illustrated by the following examples. The tests specified in these examples all had in common the following elements: they were carried out in a three-liter reactor equipped with a Moritz stirrer mechanism, a supply pipe for the gaseous mixture to be treated extending to the bottom of the reactor, and a gas outlet tube. The stirrer mechanisms rotated a 2300 r.p.m. in each test, the liquid contents of the reactor consisted of two liters of sea water, the gaseous mixture consisting of 85% by volume of butane, 10% by volume of $H_2S$, and 5% by volume of $SO_2$; the rate of flow of this gas was 50 liters per hour.

In the tables, the following symbols are used:

$Nr$: number of recyclings
$Rd$: desulfuration yield
$Rs$: sulfur recovery yield
$Rg$: total yield
$Vs$: sulfur sedimentation speed

EXAMPLE 9

This process was carried out at ambient temperature. Each test lasted 3 hours, after which the sulfur was filtered and the liquid was used again in the following test. Table II gives the results of this series of 5 successive tests.

TABLE II

| $Nr$ | $Rd$, percent | $Rs$, percent | $Rg$, percent |
|---|---|---|---|
| 0 | 85.5 | 88 | 75.2 |
| 1 | 84 | 72 | 51.8 |
| 2 | 87 | 65 | 59.2 |
| 3 | 84.5 | 39 | 33.0 |
| 4 | 84 | 33 | 27.7 |

It is seen that, if the desulfuration yield remains constant, the sulfur recovery yield, $Rs$, decreases very distinctly with the number of recycling operations; in actual fact, it is not more than 33% after the 4th recycling operation, as compared with 88% in fresh sea water.

EXAMPLES 10–16

Each of the operation of these examples was carried out with fresh sea water, but at a different temperature.

TABLE III

| Example No. | Temperature, °C. | Rd, percent | Rs, percent | Rg, percent |
|---|---|---|---|---|
| 10 | 30 | 84.5 | 88 | 74.8 |
| 11 | 40 | 86 | 86 | 74 |
| 12 | 50 | 86.5 | 96 | 83 |
| 13 | 65 | 86 | 93 | 80 |
| 14 | 75 | 82 | 83 | 68 |
| 15 | 80 | 70.5 | 79.5 | 56 |
| 16 | 90 | 65 | 83 | 54 |

It is apparent from Table III that it is at 50° C. that the sulfur recovery yield Rs is at its best, reaching in fact 96% at this temperature. The sedimentation then reaches 1.2 mm./sec. and the purity of the sulfur is from 99.6 to 99.8%.

EXAMPLE 17

A series of operations was carried out at 50° C., the aqueous liquid being recycled each time in order to be used again in the following test. Each test lasted 3 hours, as before.

TABLE IV

| Nr | Rd, percent | Rs, percent | Rg, percent | Vs |
|---|---|---|---|---|
| 0 | 86 | 91 | 78 | 1 mm./sec. |
| 1 | 86 | 97.5 | 84 | 0.2 mm./sec. |
| 2 | 89 | 90 | 80 | 0.05. |
| 3 | 89 | 94 | 83.5 | |
| 4 | 88 | 97 | 85.5 | |
| 5 | 87 | 91.5 | 80 | Very slow. |
| 6 | 89 | | | |
| 7 | 88 | 97 | 85.5 | |
| 8 | 87.5 | 91 | 79.5 | Sulfur colloidal. |
| 9 | 87 | 100 | 87 | |

It can be seen from the figures of Table IV that the sulfur recovery yield remains high and fairly constant after the recycling operations, but the sulfur sedimentation speed, Vs, is quickly reduced; from the second recycling, it becomes very low; in addition, the liquid contains colloidal sulfur.

EXAMPLE 18

In a series of tests similar to those of Example 17, at 50° C., the acidity of the liquid medium after each separation of the precipitated sulfur was determined; it was found to be close to 0.3 eq./l. This medium was then neutralized with lime to pH 6 before being used again in the following test.

The following Table V gives the results of these tests.

TABLE V

| Nr | Rd, percent | Rs, percent | Rg, percent | Ve |
|---|---|---|---|---|
| 0 | 86 | 91 | 78.5 | 1 mm./sec. |
| 1 | 86 | | | 10 mm./sec. |
| 2 | 86.5 | 95.5 | 82.5 | 35. |
| 3 | 86 | | | |
| 4 | 86.5 | 98 | 84.5 | |
| 5 | 86 | 97 | 83.5 | |
| 6 | 86 | 100 | 86 | Sedimentation practically instantaneous. |
| 7 | 86.5 | 96 | 83 | |
| 8 | 86.2 | 91 | 78.5 | |
| 9 | 86 | | | |
| 10 | 86 | 97.5 | 84 | |
| 11 | 86 | 96.5 | 83 | |

It is seen that, at 50° C., in a sea water medium at pH 6, the sulphur recovery yield is high, being 91 to 100%, and does not fall after the recycling operations carried out on the liquid; the sedimentation speed is very high and the desulfuration yield remains invariable in the region of 86%.

EXAMPLE 19

The reactor of the previous examples was arranged for continuous working; it was equipped with an overflow device at its upper end and a supplementary pipe extending downwardly to the bottom for the continuous introduction of the liquid.

50 liters per hour of a mixture of methane and nitrogen containing by volume 10% of $H_2S$ and 5% of $SO_2$ were caused to enter the reactor, the stirring mechanism rotating at 2500 r.p.m. 200 ml. of sea water were initially introduced into the apparatus. From the moment when the content of the reactor was formed by an aqueous suspension of sulfur, of which the acidity was in the region of $3 \times 10^{-2}$ equivalent/liter, there is initiated the introduction thereinto of sea water originating from the decantation of a previous operation, the pH of this liquid having been brought to 6. The suspension leaving the system in the liquid by way of the overflow device was collected, decanted and neutralized.

The decanted and neutralized liquid was reintroduced into the reactor with the slight addition of fresh sea water which was necessary to compensate for the small amount of liquid retained in the sulfur cake obtained from the decantation sludge after filtration. The sedimentation of the sulfur was practically instantaneous, while the sulfur recovery yield was on average 96%.

Thus, due to the improvement provided by the invention, sedimentation speeds of the order of 1 mm./s. are regularly effected. The sulphur deposits obtained according to the invention are easily filtrable, and yield a cake having a low water content, which results in the advantage of facilitating subsequent operations, such as transport, drying, or even direct fusion of the sulphur, under pressure; in the case of such a fusion, very pure sulphur is obtained, at least 99.8% in spite of the presence of the aqueous phase containing electrolytes.

While it will be apparent that the illustrated embodiments of the invention herein disclosed are well calculated adequately to fulfil the objects and advantages primarily stated, it is to be understood that the invention is susceptible to variation, modification, and change within the spirit and scope of the subjoined claims.

The invention having been thus described, what is claimed as new and desired to secure by Letters Patent is:

1. A process for the preparation of sulfur which comprises simultaneously introducing hydrogen sulfide and sulfur dioxide into an aqueous medium containing from 10 to 120 grams sodium chloride and from 0.6 to 85 grams magnesium sulfate per liter.

2. The process of claim 1, wherein said medium contains from 20 to 50 grams sodium chloride and from 1 to 10 grams magnesium sulfate per liter.

3. The process of claim 1, wherein said aqueous medium is constituted of sea water.

4. The process of claim 1, including the steps of (a) maintaining the temperature of said medium in the range from 45° C. to 60° C. and (b) controlling the acidity of said medium so that it does not exceed 0.04 equivalent of acid per liter.

References Cited

UNITED STATES PATENTS

| 1,079,291 | 11/1913 | Feld | 23—225 |
| 1,832,448 | 11/1931 | Coleman et al. | 23—225 |
| 1,917,351 | 7/1933 | Young | 23—226 |
| 1,995,545 | 3/1935 | Leahy | 23—225 |

OSCAR R. VERTIZ, Primary Examiner

G. O. PETERS, Assistant Examiner